No. 747,586. PATENTED DEC. 22, 1903.
S. A. BROWN.
TRAVELING CLOTHES LINE.
APPLICATION FILED JULY 20, 1903.
NO MODEL.
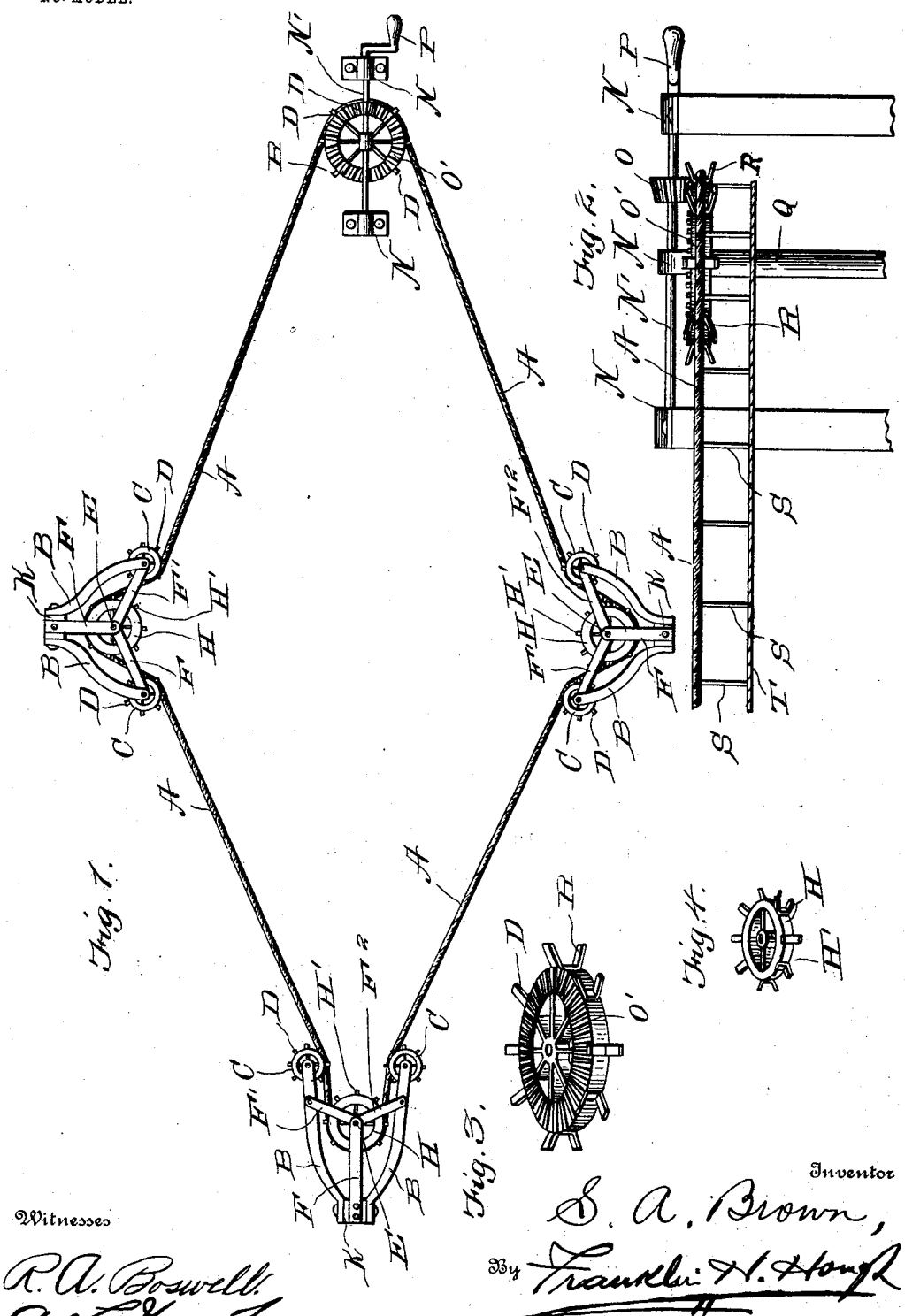

No. 747,586. Patented December 22, 1903.

UNITED STATES PATENT OFFICE.

SHERMAN A. BROWN, OF ALDEN, KANSAS.

TRAVELING CLOTHES-LINE.

SPECIFICATION forming part of Letters Patent No. 747,586, dated December 22, 1903.

Application filed July 20, 1903. Serial No. 166,388. (No model.)

*To all whom it may concern:*

Be it known that I, SHERMAN A. BROWN, a citizen of the United States, residing at Alden, in the county of Rice and State of Kansas, have invented certain new and useful Improvements in Traveling Clothes-Lines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in clothes-lines, and comprises an endless cable traveling about suitable wheels and supporting a clothes-line parallel with the cable and so arranged as not to interfere with the cable or the wheels about which it travels, and suitable motor mechanism for rotating the cable, whereby an operator may bring different portions of the line at a location convenient to apply or remove clothes from the line.

The invention consists in various details of construction and combinations and arrangements of parts, which will be hereinafter fully described and then specifically defined in the appended claim.

I illustrate my invention in the accompanying drawings, in which—

Figure 1 is a top plan view of my clothes-line apparatus. Fig. 2 is a side view of a portion of the apparatus, showing in elevation the clothes-line suspended from the cable. Fig. 3 is a perspective view of one of the wheels about which the cable travels. Fig. 4 is a detail view of another form of wheel utilized and about which the cable is adapted to travel.

Reference now being had to the details of the drawings by letter, A designates an endless cable made of any suitable material, and pivotally mounted upon bracket-arms B are the pulleys C in pairs, one arranged on each bracket-arm and spaced apart. About the circumferences of said pulleys are the U-shaped guide members D, of the same construction as the guide members on the pulley H, hereinafter described, serving to hold the cable upon the circumference of the pulley, and rotatably mounted and supported upon a pin E, connecting the three arms F, F', and $F^2$ at their point of intersection, is a pulley H, which is also provided with the U-shaped guide members H' about its circumference to hold the cable to said pulley. The ends of the arms F' and $F^2$ have pivotal connections with the arms B, and the arm F may be adjustably held to a support or beam K, whereby the tension of the cable may be regulated. The arms B are of sufficient resiliency to permit a limited movement toward each other when the arm F is adjusted in its connection at its free end with the support K. In the drawings are illustrated three sets of pulleys arranged as described and about which the cable is adapted to turn.

Journaled in suitable bearings N is a shaft N', having a bevel gear-wheel O fixed thereto which is in mesh with the teeth in the bevel gear-wheel O', which latter is journaled on a suitable post Q. (Shown clearly in Fig. 2 of the drawings.) Said gear-wheel O' has the guide members R about its circumference to hold the cable about the circumference of said gear-wheel, and a crank-arm P is fitted to the end of the shaft N', whereby the latter may be rotated and also the wheel O', having gear connections with said shaft for the purpose of imparting a longitudinal movement to the cable.

Referring to Fig. 2 of the drawings, it will be observed that a clothes-line T is suspended from the cable by means of the stay-pieces S, which hold said clothes-line a suitable distance below the cable and parallel therewith its entire length, and upon said clothes-line the clothes to be dried may be fastened in any suitable manner, and by reason of the line being positioned as illustrated they will not come in contact with the pulleys or other parts of the apparatus by which the cable is rotated.

From the foregoing it will be observed that by the provision of a clothes-line apparatus embodying the features of my invention the clothes may be run out from any location by the simple turning of the crank and may be returned to the starting-point for removing the clothes, thus forming a convenient means for drying clothes without the necessity of the operator walking about.

While I have shown a particular construction of apparatus illustrating my clothes-line and means for operating the same, it will be understood that I may make alterations in the detailed construction of the same, if desired, without departing from the spirit of the invention.

Having thus fully described my invention, what I claim as new, and desire to secure by Letters Patent, is—

A clothes-line apparatus comprising an endless cable, bracket-arms, supports to which the latter are fixed, pulleys with guide members about their circumference journaled in the ends of said bracket-arms, bars adjustably mounted upon said arms and supports, a pin mounted in the intersecting ends of said bars, a pulley journaled upon said pin intermediate of the pulleys carried by the arms, a gear-wheel about the circumference of which said cable travels, means for rotating said gear-wheel, and a clothes-line suspended from the cable, as set forth.

In testimony whereof I hereunto affix my signature in presence of two witnesses.

SHERMAN A. BROWN.

Witnesses:
V. H. WAGNER,
H. K. BRADLEY.